United States Patent
Roberts et al.

(10) Patent No.: US 9,208,439 B2
(45) Date of Patent: Dec. 8, 2015

(54) GENERALIZED CONTEXTUAL INTELLIGENCE PLATFORM

(71) Applicant: Palo Alto Research Center Incorporated, Palo Alto, CA (US)

(72) Inventors: Michael Roberts, Los Gatos, CA (US); Shane P. Ahern, Foster City, CA (US); Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 282 days.

(21) Appl. No.: 13/873,061

(22) Filed: Apr. 29, 2013

(65) Prior Publication Data

US 2014/0324751 A1    Oct. 30, 2014

(51) Int. Cl.
G06N 5/02      (2006.01)
G06Q 30/02     (2012.01)

(52) U.S. Cl.
CPC .............. *G06N 5/02* (2013.01); *G06Q 30/0269* (2013.01)

(58) Field of Classification Search
CPC ........................................................ G06N 5/02
See application file for complete search history.

(56) References Cited

U.S. PATENT DOCUMENTS

| | | | |
|---|---|---|---|
| 2002/0173295 A1 | 11/2002 | Nykanen et al. | |
| 2012/0046770 A1* | 2/2012 | Becker et al. | 700/94 |
| 2012/0122476 A1 | 5/2012 | Lee et al. | |
| 2012/0203640 A1* | 8/2012 | Karmarkar et al. | 705/14.66 |
| 2013/0110992 A1* | 5/2013 | Ravindra et al. | 709/220 |
| 2013/0254213 A1* | 9/2013 | Cheng et al. | 707/748 |
| 2014/0297739 A1* | 10/2014 | Stein et al. | 709/204 |

OTHER PUBLICATIONS

Bellotti, Victoria et al., "Activity-Based Serendipitous Recommendations with the Magitti Mobile Leisure Guide", CHI 2008 Proceedings, Apr. 5-10, 2008.

* cited by examiner

*Primary Examiner* — Alan Chen
(74) *Attorney, Agent, or Firm* — Shun Yao; Park, Vaughan, Fleming & Dowler LLP

(57) ABSTRACT

One embodiment of the present invention provides a system for providing user information to a recommender. During operation, the system receives, from the recommender, a registration for notification of changes to a context graph. The context graph includes information about user behavior and/or user interests. Next, the system receives, from a mobile device, event data derived from contextual data collected using detectors that detect the mobile device's physical surroundings. The system modifies the context graph based on the event data. The system then determines that the modification to the context graph matches the registration, and sends a notification of context graph change to the recommender.

20 Claims, 8 Drawing Sheets

GENERALIZED CONTEXTUAL INTELLIGENCE PLATFORM

BACKGROUND

1. Field

This disclosure is generally related to contextual intelligence. More specifically, this disclosure is related to a method and system for collecting mobile device contextual information and facilitating efficient adaptation of a generic contextual intelligence system for customized applications.

2. Related Art

As mobile devices equipped with technology to detect physical surroundings become more pervasive in our everyday lives, software on the mobile devices that detect and make use of physical surroundings can increasingly contribute to improving the lifestyle of mobile device users. Such software includes context-aware systems that may adapt to the computing environment, including physical surroundings, and make recommendations based on the physical surroundings. A context-aware system on a mobile device detects the computing environment and adapts to changing conditions detected from the environment, such as location and movement of the mobile device, nearby devices, and other surrounding conditions.

Such context-aware systems may vary according to architecture and user model. A user model describes user activity and interests at different points in time, including present and future activity. The system may recommend activities, such as leisure activities, based on the user model. Unfortunately, it takes considerable time and expense to develop such context-aware systems.

SUMMARY

One embodiment of the present invention provides a system for providing user information to a recommender. During operation, the system receives, from the recommender, a registration for notification of changes to a context graph. The context graph includes information about user behavior and/or user interests. Next, the system receives, from a mobile device, event data derived from contextual data collected using detectors that detect the mobile device's physical surroundings. The system modifies the context graph based on the event data. The system then determines that the modification to the context graph matches the registration, and sends a notification of context graph change to the recommender.

In a variation on this embodiment, the system receives, from the mobile device, additional event data including application event data and/or operating system event data. The system then modifies the context graph based on the additional event data. The system determines that the modification to the context graph matches the registration, and sends a notification of context graph change to the recommender.

In a variation on this embodiment, the event data includes high-level event data generated by the mobile device from contextual data.

In a variation on this embodiment, the system receives a query for context graph data from the recommender, and sends the context graph data to the recommender.

In a variation on this embodiment, the system receives real-time event data through a RESTful WebAPI, and modifies the context graph data based on the received real-time event data.

In a variation on this embodiment, the system receives bulk upload of event data through an event posting interface, and modifies the context graph data based on the received bulk upload event data.

BRIEF DESCRIPTION OF THE FIGURES

In the figures, like reference numerals refer to the same figure elements.

DETAILED DESCRIPTION

Figure 1:
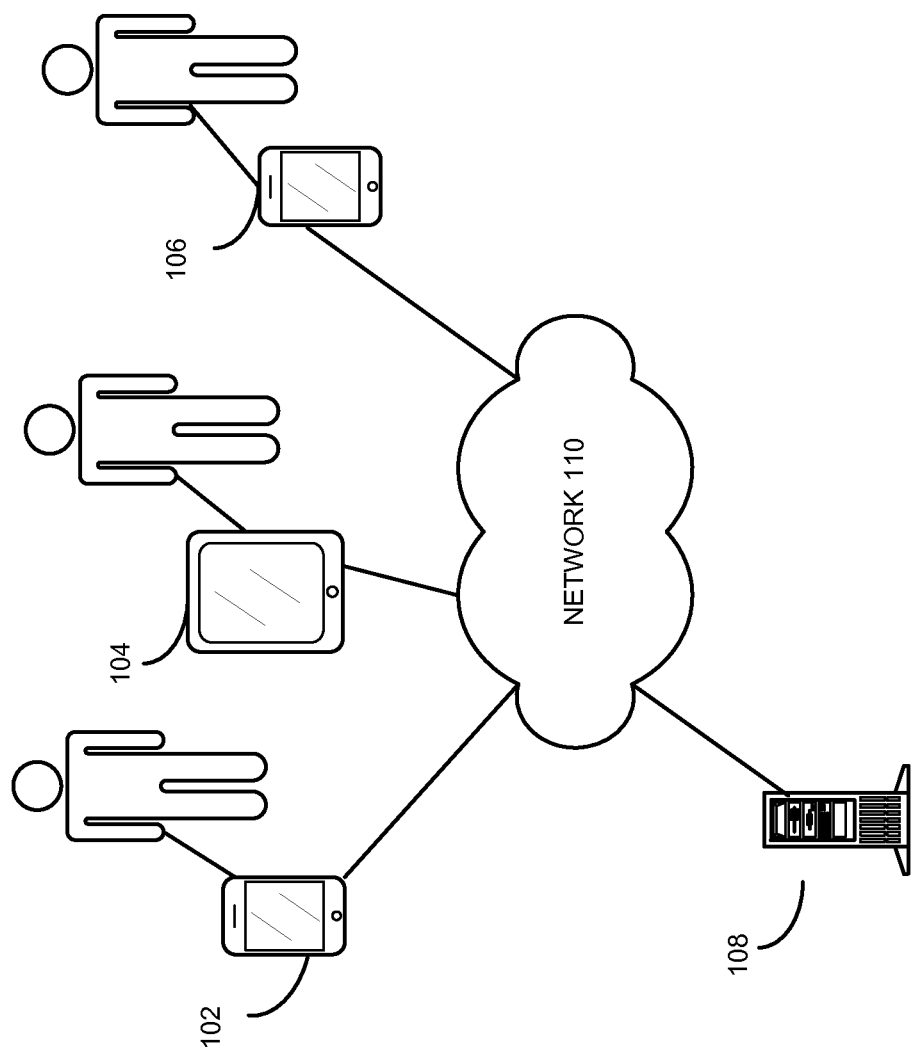
FIG. 1 presents a block diagram illustrating mobile devices communicating event data to a server, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of efficiently developing context aware systems by providing a generic contextual intelligence platform that may be adapted for specific applications. Such a contextual intelligence system facilitates real-time processing of contextual information and support contextual application development for Web and mobile applications.

The generic contextual intelligence platform includes a client-side architecture and a server-side architecture. The client-side architecture collects contextual data and sends processed contextual data to the server-side architecture as event data. Contextual data describes a computing context detected by a mobile device client, such as physical surroundings and/or application and/or operating system context. The server-side architecture stores the contextual data and uses the contextual data to modify a graph containing user behavior and interest information. Applications may use information from the graph to modify application-specific user models and generate recommendations.

The client-side architecture collects contextual data by detecting a computing context including physical surroundings, application, and operating system context, and analyzes and writes the collected data to storage. The client-side architecture processes context detected through a hardware detector, from an application, or from the operating system, and the resulting contextual data is stored as low-level event data. Low-level event data indicate events that are detected from context, and not generated, by the client-side architecture. For example, a low-level event can be a walking pattern sensed by an accelerometer, the selection of a button in an application, or a screen capture. The client-side architecture may generate high-level events using the contextual data and send the high-level events to a server. A high-level event can be, for example, a user reading e-mail. The client-side architecture may also send event data to applications executing on the client.

The server-side architecture receives event information from the client and may analyze the event information to modify a context graph. A context graph is an in-memory model that stores facts and assertions about a user's behavior and interests. The server may also use a publish/subscribe event system to send events to recommenders. A recommender is an application that recommends items or activities for a user. These recommenders maintain application-specific user models using user information derived from the context graph. The server sends event data to a recommender when the event matches a subscription request from that particular recommender. The recommenders then modify their application-specific user models with the user information and make recommendations based on the application-specific user models.

In order to adapt the disclosed generic infrastructure to customized needs, one need only provide customized activity detection modules, customized user models, and/or customized recommenders. The infrastructure is designed as a modular structure and the different functions are compartmentalized and not dependent on each other. One can customize one or more modules for their particular application and/or also use default modules. An engineer adapting the generic infrastructure may embed contextual intelligence in their application and even monetize the application with contextually aware features. By adapting a generic infrastructure, one can save considerable time and expense in developing a customized contextual intelligence system.

Detailed Description

FIG. 1 presents a block diagram illustrating mobile devices communicating event data to a server, according to an embodiment. In FIG. 1, mobile devices 102, 104, and 106 collect contextual data using detectors such as a GPS, an accelerometer, and/or a compass. Such contextual data may indicate that a user is performing certain activities such as, for example, walking, running, or opening an application on the mobile device. The contextual data may also include low-level operating system event data. The mobile devices can process and store the contextual data as low-level event data. The mobile devices can also generate high-level event data, such as data to indicate that a user is writing a document. The mobile devices may send event data to a server 108 through a network 110. In one embodiment, mobile devices may send only high-level events to the server.

Server 108 stores, analyzes, and publishes the received event data. Server 108 may modify a context graph using the event data. One can modify application-specific user models by using user information stored in the context graph. Such application-specific user models facilitate implementation of recommender applications.

Client-Side Architecture

Figure 2:
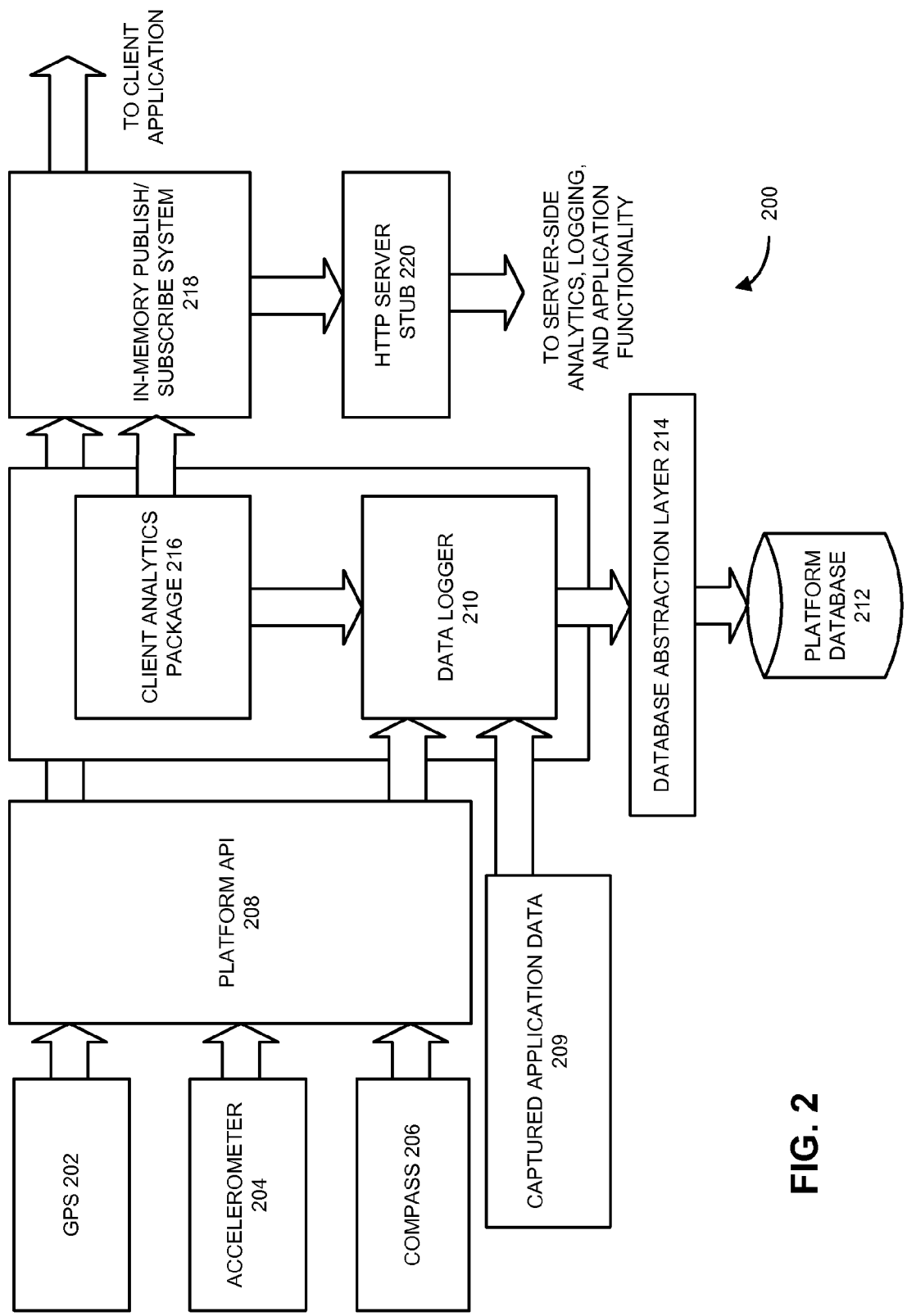
FIG. 2 presents a block diagram illustrating a client side architecture, according to an embodiment.

FIG. 2 presents a block diagram illustrating a client-side architecture, according to an embodiment. Client-side architecture 200 includes various components for collecting physical and application contextual data, then processing and recording the data to a database. The components analyze the data and generate high-level events based on the analyzed data. Client-side architecture 200 publishes the events to applications on a client and to a server.

Client-side architecture 200 includes physical detectors such as GPS 202, accelerometer 204, and compass 206. The physical detectors detect physical context surrounding a mobile device and the system provides abstractions for utilizing the physical detectors, including a platform application programming interface (API) 208. Platform API 208 facilitates communication with the devices and may preprocess the contextual data. Platform API 208 then sends its output to a data logger 210 and a client analytics package 216. The client analytics package 216 analyzes the physical and application data and generates high-level events to forward to the server. Multiple analytics components may run on the client. The system can also send captured application data 209 to the data logger 210. Note that captured application data 209 includes user events occurring within an application. The data logger 210 may write the physical context data and the captured application data to a platform database 212 via a database abstraction layer 214. Platform database 212 stores historical traces to facilitate analysis of the data.

The system can collect contextual data using a number of different techniques. The system can obtain the contextual data either from inside a client application, or via a specific data-logger application. For example, the system can collect contextual data directly from applications via embedded hooks. The system can also collect contextual data through the operating system, including by capturing screens, detecting click events, and transferring event log files. Further, the system can collect contextual data from devices such as GPS receivers, accelerometers, etc.

The client-side architecture 200 implements a centralized listener pattern that allows for connected applications to register to receive contextual events from the analytics system. There may be a number of applications and modules that register for and utilize contextual information. Using the centralized listener pattern, the client can also transfer events to a centralized server system, either as low-level activity traces, or as higher level events generated by the analytics systems.

An in-memory publish/subscribe system 218 implements the centralized listener pattern to provide contextual events to client applications and to the HTTP server stub 220. The client-side architecture 200 allows applications to register for particular types of events. For example, an application interested in location-specific events may choose to register for GPS events. With client-side analytics and interest registration, the infrastructure can reduce the impact of a multi-user system with a large volume of events, thereby reducing the likelihood of overloading a server.

In one embodiment, the HTTP server stub 220 facilitates transmission of high-level events to a remote server. The HTTP server stub 220 can receive events from the publish-subscribe system 218 and transmit events using HTTP to a remote server system (e.g., in JavaScript Object Notation (JSON) format). Note that one can configure the stub to customize transmission of events. In one embodiment, the stub only relays events that are registered with the publish/subscribe system.

Sending Data to Server

Server-side processing facilitates social applications, applications that require a higher level of data processing than can be accomplished on a single client, or applications that require a server-side persistent state. For these scenarios requiring server-side processing, the client can upload data to the server either by uploading in real time or using bulk upload.

For continuous, real-time events upload, the client can post JSON messages to a server-based RESTful Web API. A RESTful web API is a web service implemented using HTTP and the principles of representational state transfer (REST). REST is a style of software architecture for distributed systems such as the World Wide Web. The client can identify the real-time events with a userid for the user the data is associated with. Real-time upload of events allows the client to continuously update user state for real-time applications.

For bulk uploads the client can use HTTP POST to upload large data files (e.g., from a database). Application-specific code can process such bulk uploads into a server-side data store. Note that clients can use bulk upload for large blocks of data, such as screenshots or extensive low-level log files intended for analysis using machine-learning techniques.

Server-Side Event Processing

Figure 3:
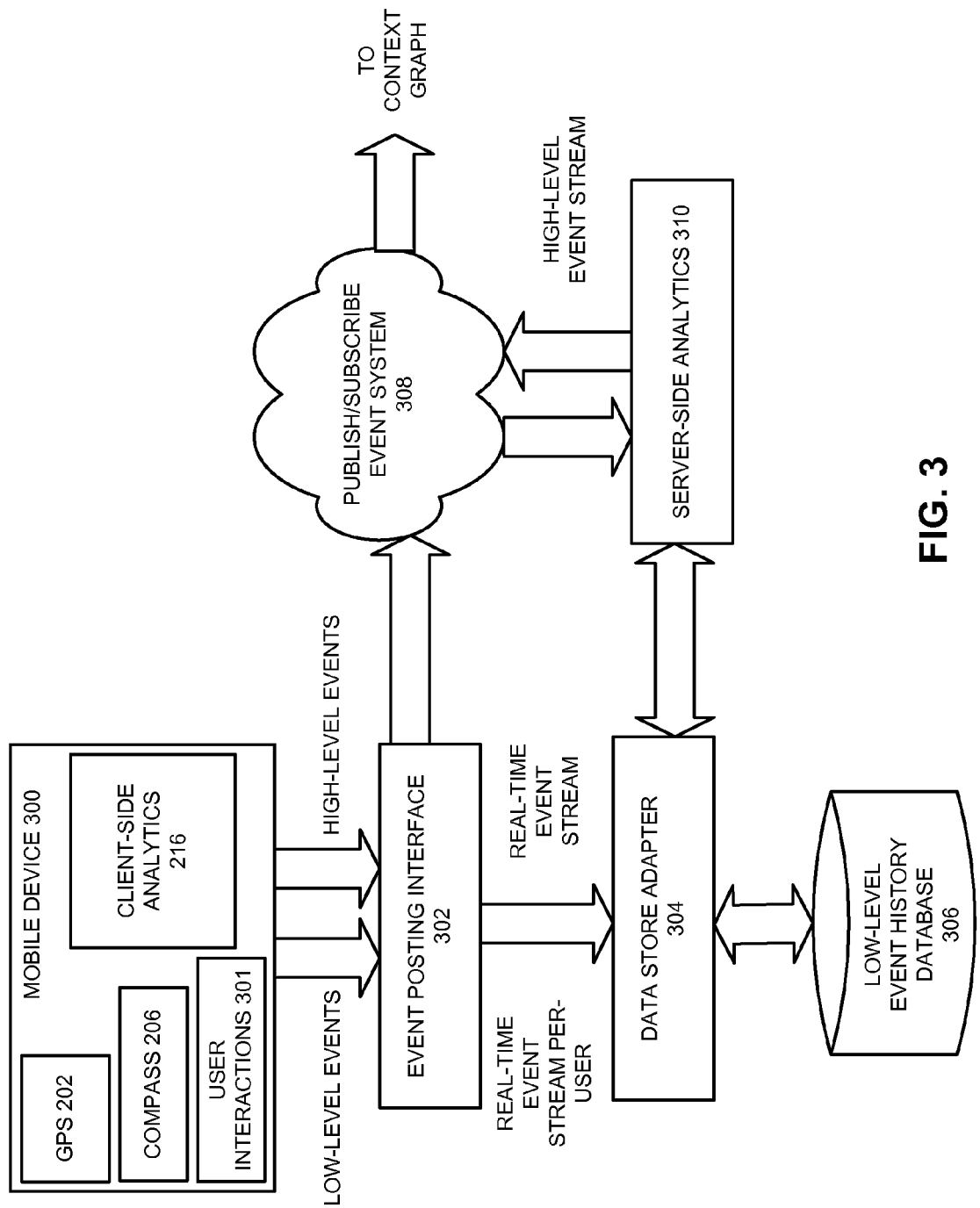
FIG. 3 presents a block diagram illustrating the relationship between client-side and server-side event processing components, according to an embodiment.

FIG. 3 presents a block diagram illustrating the relationship between client-side and server-side event processing components, according to an embodiment. FIG. 3 illustrates an event processing system in the server receiving event data from a mobile device and the subsequent analysis and storage of the event data. This figure also shows server component interactions with a publish/subscribe event system that sends event data to a context graph. The context graph stores generic user model information that may be adapted for application-specific user models and is further described in conjunction with FIG. 4.

In FIG. 3, as described with respect to FIG. 2, a mobile device 300 initially collects physical contextual data using GPS 202 and compass 206, as well as detect application events including user interactions 301. Mobile device 300 may analyze contextual data and/or generate high-level events using client-side analytics 216 and transmit events to the server. The client can transmit both high-level events and low-level events to the server via an event posting interface 302 and/or a RESTful WebAPI (see FIG. 4).

When the server receives events at the server-side RESTful WebAPI, the server can convert the events into internal message queue events. Using a message queuing architecture on the server allows the system to decouple event reception from event processing. Any module on the server can subscribe to the message queue, either using a user identifier or otherwise.

The server may write the event data to storage, analyze the data, and/or publish the event data. The server may write the data to storage for subsequent analysis. The server may transfer event information from an event posting interface 302 to data store adapter 304. Such event information may be transferred via a real-time event stream, which may include streams of real-time events for each user. The server may use a data store adapter 304 to record events to low-level storage, such as low-level event history database 306. Low-level event history database 306 can be, for example, a NoSQL database storing low-level event history information.

Server-side analytics 310 can include machine learning modules for analyzing the event data. Components in server-side analytics 310 can access real-time data from the publish/subscribe event system 308 or historical data from the low-level event history database 306. Typically, such components run in batch mode rather than real-time. In one implementation, such components may run during low load periods (e.g., at night time) in order to optimize user models. The system may redirect the processing output from such components back into the event processing system for transfer into a context graph. The server can also write the output from server-side analytics 310 into low-level event history database 306.

Figure 4:
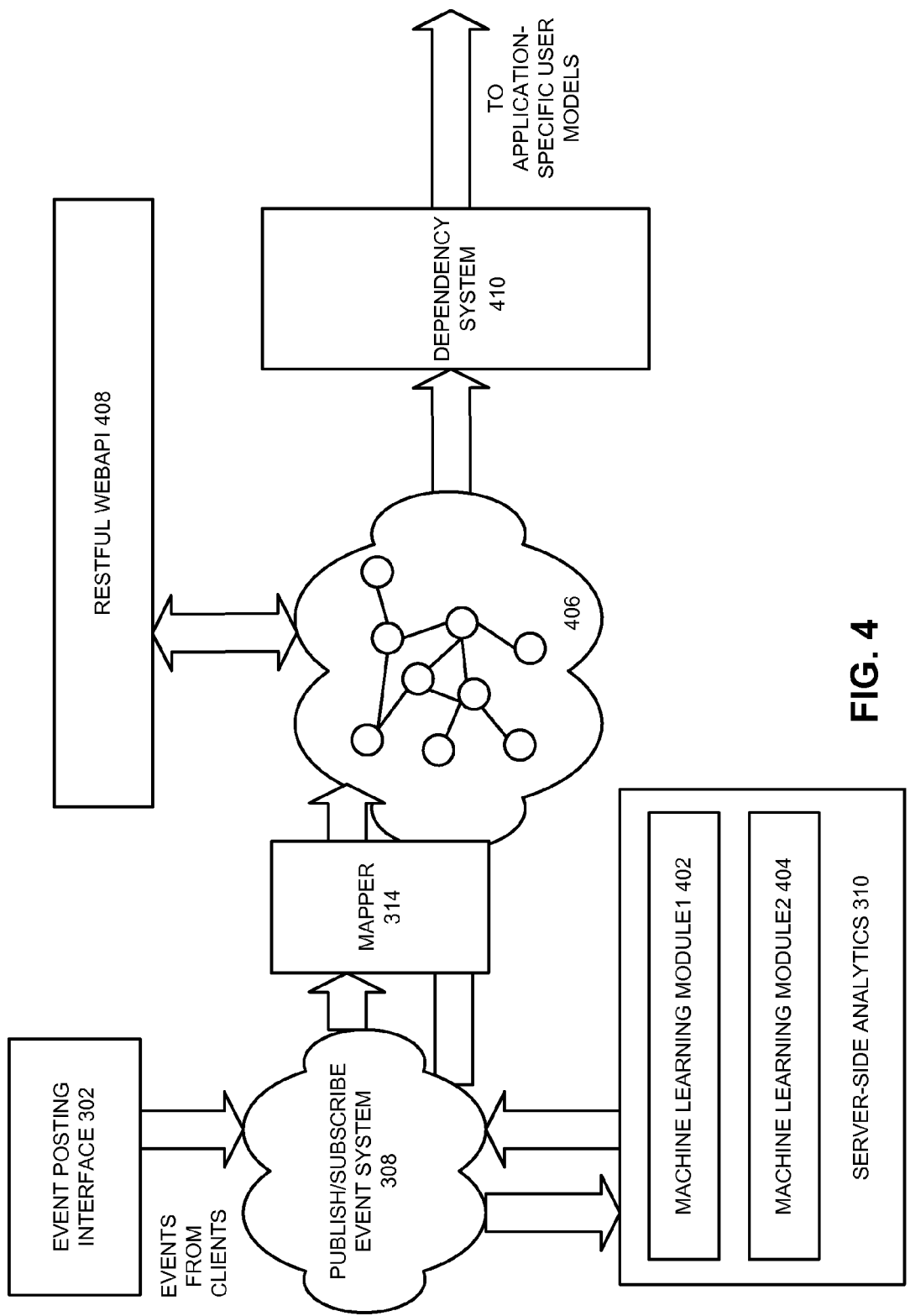
FIG. 4 presents a block diagram illustrating the relationship between events, the mapper, and the context graph, according to an embodiment.

The server may also publish event data to subscribers, and may use some of the event data to modify a context graph, as further discussed in FIG. 4. The server may publish events through a publish/subscribe event system 308 using multiple, concurrent, queues. Server-side analytics 310 may use a high-level event stream to send events to publish/subscribe event system 308.

In one implementation, the server may use RabbitMQ for message queuing functionality. The server may also use high performance event processing subsystems for greater transaction volumes, such as that based on OMQ or message passing interface (MPI). OMQ is a high-performance synchronous messaging library for use in scalable distributed or concurrent applications. MPI is a portable, standardized message-passing system that functions on parallel computers. In one implementation, the system includes an embeddable stub that allows analytic components to post data from an application into publish/subscribe event system 308, where the data can be transferred to a context graph.

The server can also receive and combine data from multiple clients to leverage its greater processing power. In one embodiment, the server may analyze data aggregated from a number of clients. For example, the server may analyze co-location events involving locations of a number of clients. To transfer data back to a client, a server-side application may push events into a client's publish/subscribe system asynchronously using a long-poll persistent push connection. For example, the server may push notifications to the clients involved in the co-location events. Note that the system may also use a long-poll connection to deliver recommendations to clients. For example, the system may inject recommendations as specially labeled messages into the event processing system, which transfers the messages to the client for display via a long-poll connection. Note that the system may also use traditional polling instead of long-polling.

One embodiment of the present invention may also include a framework for developing machine learning components that include stubs providing access to stored event data and real-time events, and access to publish/subscribe event system 308 for posting events into the system. Machine learning modules can use a data-driven approach, in that their parameters are serializable into a database.

In one embodiment, the system instantiates a machine learning component in an application using a low number of function calls. The system can instantiate a suitable component with data from the database. The system can then connect the component to the event processing system, and activate the component for a particular user. In one implementation, a web-based authoring system can facilitate the design and provisioning of such functionality.

Relationship Between Events, Mapper, and Context Graph

FIG. 4 presents a block diagram illustrating the relationship between events, the mapper, and the context graph, according to an embodiment. The operation of the server includes receiving events from clients and publishing events to subscribers. Some of the subscribers are machine learning modules, and others include a mapper and a dependency system. The mapper and a RESTful WebAPI modify the context graph, and the dependency system provides context graph change information to recommenders. The recommenders can modify implementation-specific user models based on the data received from the context graph, and make recommendations based on the information-specific user models. For example, a recommender can utilize data from a user model to affect the score of an item when determining a recommendation.

As illustrated in FIG. 4, during operation, event posting interface 302 sends events received from clients to publish/subscribe event system 308. Publish/subscribe event system 308 may send some events to machine learning modules, such as machine learning module1 402 and machine learning module2 404, which form part of server-side analytics 310. The machine learning modules may determine appropriate responses to events. The system may employ a number of different types of machine learning modules, including classifiers, re-enforcement learners, and other miscellaneous types. The system can train classifiers using historical data from the low-level event history. The classifiers may also have a detection component, which can run either in real-time on the event stream, or periodically on the data in the stored history. Re-enforcement learners can also observe changes to the mobile device context via event observation and learn appropriate responses.

In one embodiment, the system may store contextual data for each user. Each user is associated with a context graph 406 that describes their current state. Context graph 406 is a per-user, in-memory, graph-based model that stores facts and assertions about user behavior and actions. Context graph 406 is a database of information about the user. For example, context graph 406 may include data relating to the personal habits of the user. Such data may include that a user tends to drink coffee at four o'clock, or that the user tends to go to work at two o'clock.

Context graph 406 functions as a storage component of a generalized user model. A user model describes predicted current and future activities and interests for a user. The system can store data in context graph 406 using a type-less approach to data storage. Context graph 406 may store data according to different data models, including data models for entity-relationship data and unstructured data. Note that context graphs can also be shared between users. In one embodiment, the system can manage context graphs with greater numbers of nodes using cross module interconnections.

The system enters data into context graph 406 through subscriptions to publish/subscribe event system 308. A mapper 314 modifies context graph 406 after receiving information from publish/subscribe event system 308. The components that transfer event information into context graph 406 can be specially developed for specific applications. As discussed with respect to FIG. 2, clients may also send and receive information directly to and from the context graph 406 using a RESTful WebAPI 408.

Dependency System

A dependency system 410 connects recommenders to context graph 406 so that the system may notify recommenders of context graph changes. Changes to the data in context graph 406 trigger changes and alerts via the dependency system 410. Such changes include topological changes and/or changes to individual properties on objects (e.g., nodes and edges) in context graph 406.

Dependency system 410 can transfer data from context graph 406 into an application-specific user model. Such an application-specific user model may be used in a rule or mixed-model based recommender or any other type of recommender.

In one embodiment, when the dependency system 410 detects the graph changes, the changes trigger a recommender to compute rankings and/or scores for recommendable items and/or activities and/or services. The recommender may push recommendations asynchronously to the client.

A recommender using the data in context graph 406 can register for graph modification callbacks with dependency system 410. The recommender can use the callbacks, in conjunction with graph queries and assertions, to update application-specific model values when graph data changes in context graph 406. The recommender may then generate and/or modify recommendations based on the application-specific model values.

Note that the data stored in context graph 406 and the change notification mechanism is sufficient for many recommendation applications. However, for more sophisticated applications, such as a mixed-model recommendation system, one can add an interface layer for propagating changes from context graph 406 to an application-specific user model. Further, one may also add a query language to the system so that the recommenders may use the query language to issue queries against the context graph, thereby facilitating update of the application-specific user model.

Exemplary Prototype Applications

Two exemplary prototype applications utilizing application-specific user models are discussed below. The first example is a rule-based recommendation engine that uses dependency system 410 to update rules. The second example is a mixed-model content recommendation system that subscribes to the context graph 406 and uses their output to affect changes to its variables. Additionally, modules for combining recommendations are suggested below.

In one embodiment, a system using a rule-based recommendation engine may use the dependency system to update the status of rules, which can push recommendations to a client. Changes to the context graph trigger re-evaluation of the rule state. When the rule state changes, the recommender makes recommendations via the association of a recommendable item with the rule. In a trivial case, the recommender pushes recommendations to a client. More complex systems can vote on recommendations, with the votes assembled via a ranking system.

In another embodiment, a mixed-model content recommendation system can utilize discrete variables to indicate user interest in particular subjects, and can score or rank content that has similar variables indicating the content type. The mixed-model system can subscribe to the context graph, and use their output to affect changes to its variables. Each recommendable item can be characterized by a number of variables in a vector space. Variables can, for example, indicate ethnicity of restaurants. When changes are made to the context graph, the recommender calculates recommendations by executing a calculation relating model factors with recommendation vector variables. The recommender then assigns each recommendable item a numerical score.

The system described herein may also include combiner modules that accept output from recommenders and combine the output to determine a recommendation score. For example, a vote-based combiner can score recommendations according to the number of votes they receive. This is suitable for combining the output from a number of rule-based recommenders. As another example, a combiner may also select a best recommendation from among multiple recommendation scores to determine an output recommendation score.

Exemplary Process for Collecting and Publishing Event Data on the Client

Figure 5:
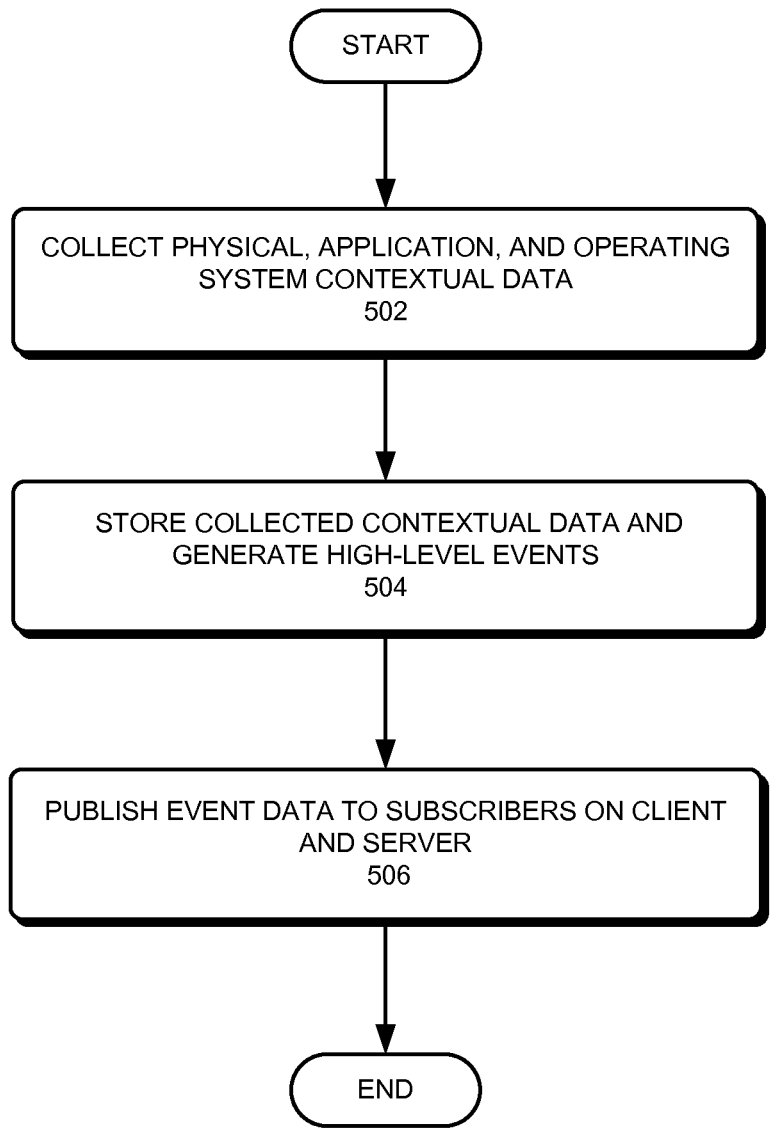
FIG. 5 presents a flowchart illustrating an exemplary process of collecting and publishing event data on the client, according to an embodiment.

FIG. 5 presents a flowchart illustrating an exemplary process of collecting and publishing event data on the client, according to an embodiment. During operation, the client initially collects physical, application, and operating system contextual data (operation 502). For example, the client may collect physical surroundings contextual data such as the location, movement, and/or compass measurement of the mobile device. The client then stores the contextual data (or otherwise processes the contextual data as low-level event data) and generates high-level events (operation 504). For example, the client may generate high-level event indicating that a user is using a web browser. The client then publishes event data to subscribers on the client and server (operation 506). The client may use event posting interface 302 and/or RESTful WebAPI 408 to send event data to the server.

Figure 6:
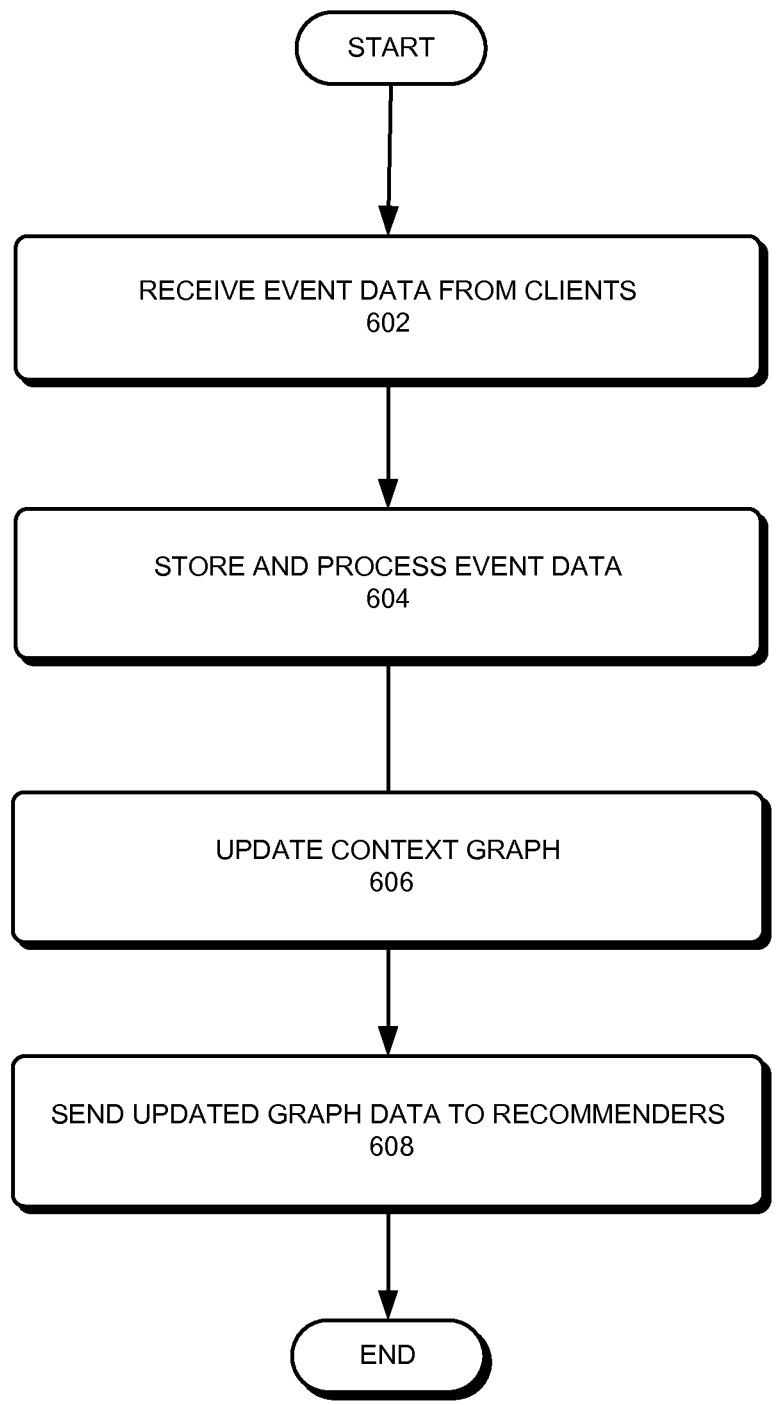
FIG. 6 presents a flowchart illustrating an exemplary process of event processing on the server, according to an embodiment.

FIG. 6 presents a flowchart illustrating an exemplary process of event processing on the server, according to an embodiment. During operation, the server receives event data from clients (operation 602). The server may queue the event data for processing. Next, the server stores and processes the event data (operation 604). The server may analyze the event data, either by performing real-time analysis or analyzing in batch mode. The server may publish events to a publish/subscribe event system. Further, the server may analyze co-location events and push events to clients. The server can update context graph 406 using the event data (operation 606). The server may modify context graph 406 using output from server analytics components. Using dependency system 410, the server may send context graph 406 data to recommenders (operation 608). When the graph changes, the system can send the new graph data to relevant recommenders. The recommenders can then form recommendations using the new graph data.

Figure 7:
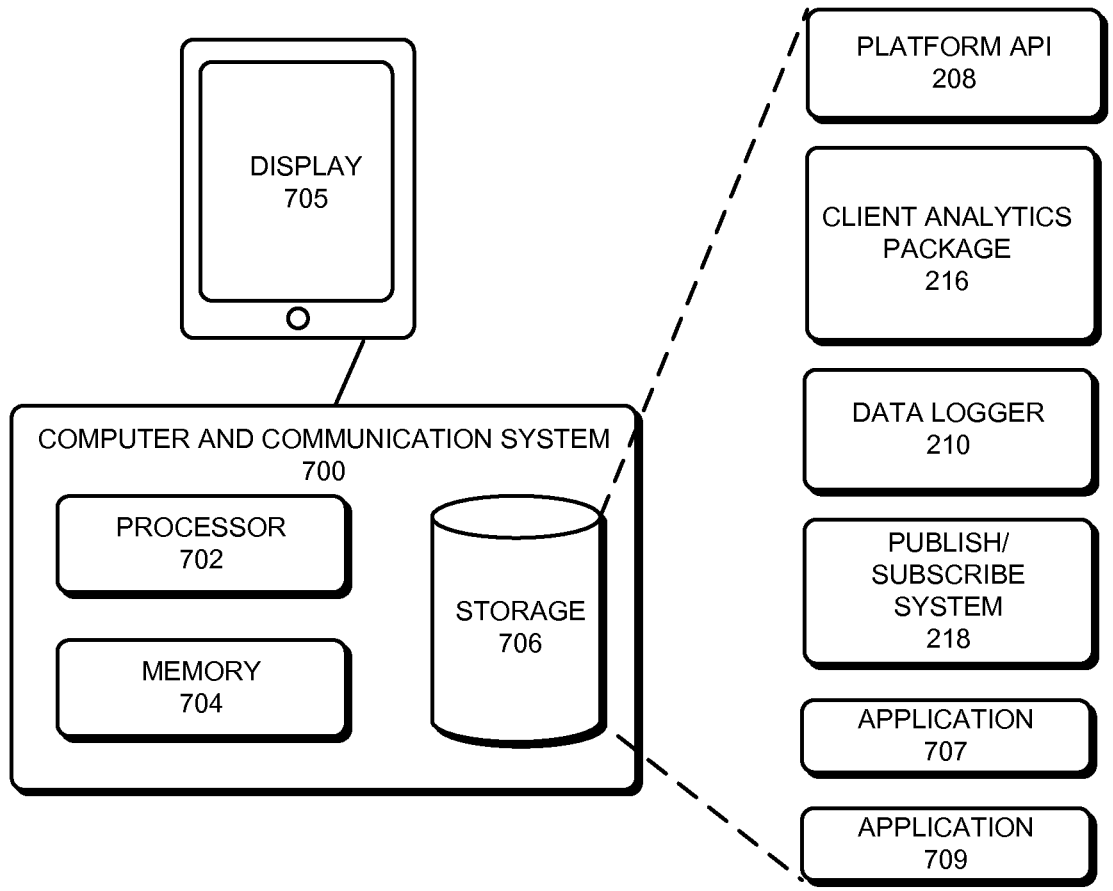
FIG. 7 illustrates an exemplary mobile device for capturing event data, in accordance with one embodiment of the present invention.

FIG. 7 illustrates an exemplary mobile device for capturing event data, in accordance with one embodiment of the present invention. In one embodiment, a computer and communication system 700 includes a processor 702, a memory 704, an optional display 705, and a storage device 706. Storage device 706 stores a number of applications, such as applications 707 and 709. Storage device 706 also stores a platform API 208, as well as other applications, such as client analytics package 216, data logger 210, and publish/subscribe system 218. During operation, the applications are loaded from storage device 706 into memory 704 and then executed by processor 702. While executing the program, processor 702 performs the aforementioned functions.

Figure 8:
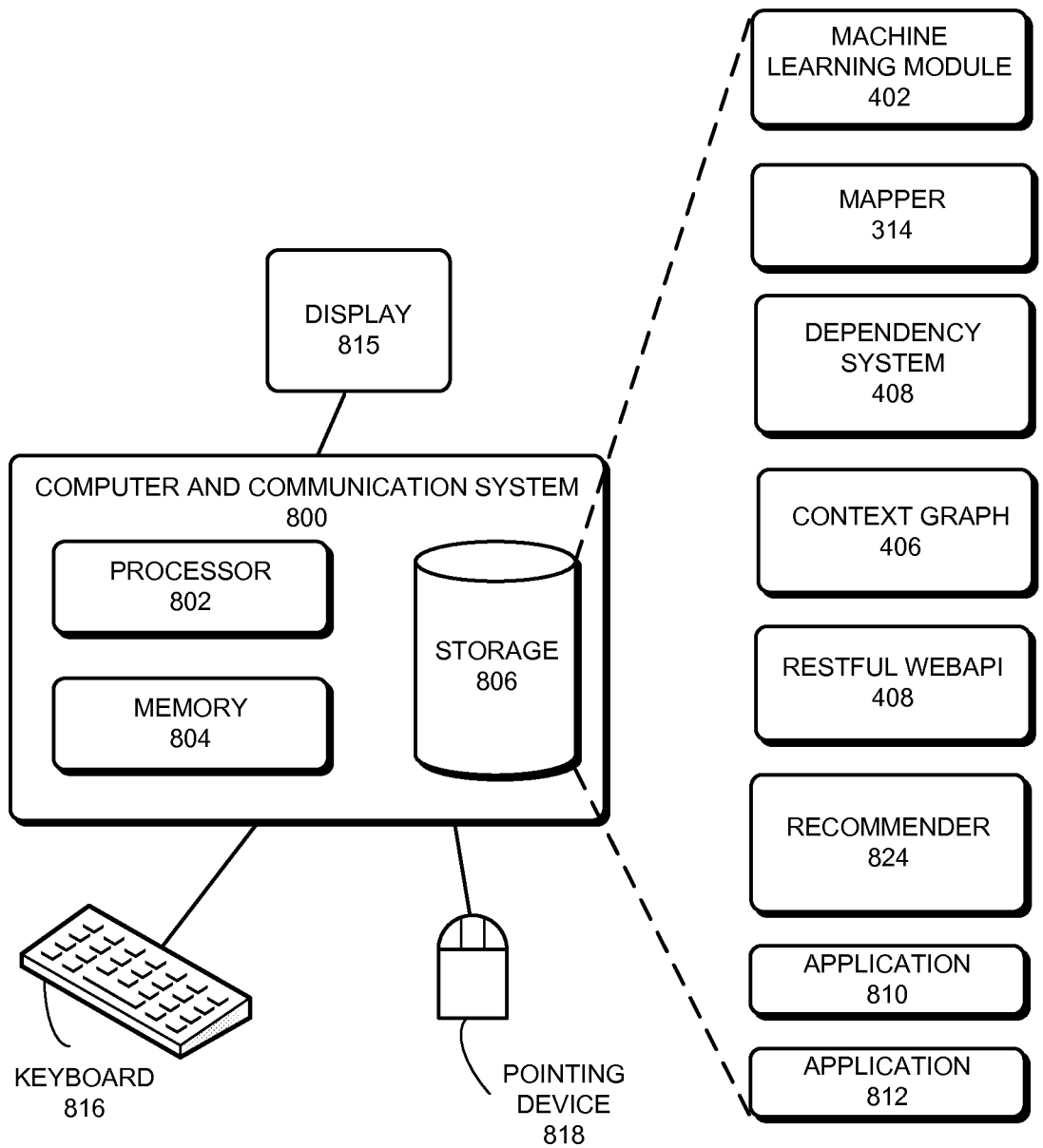
FIG. 8 illustrates an exemplary server for processing events, in accordance with one embodiment of the present invention.

FIG. 8 illustrates an exemplary server for processing events, in accordance with one embodiment of the present invention. In one embodiment, a computer and communication system 800 includes a processor 802, a memory 804, and a storage device 806. Storage device 806 stores a number of applications, such as applications 810 and 812. Storage device 806 also stores a machine learning module 402, mapper 314, dependency system 410, context graph 406, RESTful WebAPI 408, and recommender 824. During operation, one or more applications are loaded from storage device 806 into memory 804 and then executed by processor 802. While executing the program, processor 802 performs the aforementioned functions. Computer and communication system 800 is coupled to an optional display 815, keyboard 816, and pointing device 818.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   receiving, from a mobile device, event data derived from contextual data collected using detectors that detect a physical context surrounding the mobile device;
   modifying a context graph that stores facts and assertions about a user's behavior and interests using the event data;
   in response to determining that there exists a registration for notification of changes that matches the modification to the context graph, sending a notification of context graph change to a recommender.

2. The method of claim 1, further comprising:
   receiving, from the mobile device, additional event data including application event data and/or operating system event data;
   modifying the context graph based on the additional event data;
   determining that the modification to the context graph matches the registration; and
   sending a second notification of context graph change to the recommender.

3. The method of claim 1, wherein the event data includes high-level event data generated by the mobile device from contextual data.

4. The method of claim 1, further comprising:
   receiving a query for context graph data from the recommender; and
   sending the context graph data to the recommender.

5. The method of claim 1, further comprising:
   receiving real-time event data through a RESTful WebAPI; and
   modifying the context graph based on the received real-time event data.

6. The method of claim 1, further comprising:
   receiving bulk upload of event data through an event posting interface; and
   modifying the context graph based on the received bulk upload event data.

7. A non-transitory computer-readable storage medium storing instructions that when executed by a computer cause the computer to perform a method, the method comprising:

receiving, from a mobile device, event data derived from contextual data collected using detectors that detect a physical context surrounding the mobile device;

modifying a context graph that stores facts and assertions about a user's behavior and interests using the event data;

in response to determining that there exists a registration for notification of changes that matches the modification to the context graph, sending a notification of context graph change to a recommender.

8. The non-transitory computer-readable storage medium of claim 7, wherein the computer-readable storage medium stores additional instructions that, when executed, cause the computer to perform additional steps comprising:

receiving, from the mobile device, additional event data including application event data and/or operating system event data;

modifying the context graph based on the additional event data;

determining that the modification to the context graph matches the registration; and sending a second notification of context graph change to the recommender.

9. The non-transitory computer-readable storage medium of claim 7, wherein the event data includes high-level event data generated by the mobile device from contextual data.

10. The non-transitory computer-readable storage medium of claim 7, further comprising:

receiving a query for context graph data from the recommender; and sending the context graph data to the recommender.

11. The non-transitory computer-readable storage medium of claim 7, further comprising:

receiving real-time event data through a RESTful WebAPI; and modifying the context graph based on the received real-time event data.

12. The non-transitory computer-readable storage medium of claim 7, further comprising:

receiving bulk upload of event data through an event posting interface; and modifying the context graph based on the received bulk upload event data.

13. A computing system comprising:

one or more processors, a non-transitory computer-readable medium coupled to the one or more processors having instructions stored thereon that, when executed by the one or more processors, cause the one or more processors to perform operations comprising:

receiving, from a mobile device, event data derived from contextual data collected using detectors that detect a physical context surrounding the mobile device;

modifying a context graph that stores facts and assertions about a user's behavior and interests using the event data;

in response to determining that there exists a registration for notification of changes that matches the modification to the context graph, sending a notification of context graph change to a recommender.

14. The computer-readable storage medium of claim 13, wherein the computer-readable storage medium stores additional instructions that, when executed, cause the computer to perform additional steps comprising:

receiving, from the mobile device, additional event data including application event data and/or operating system event data;

modifying the context graph based on the additional event data;

determining that the modification to the context graph matches the registration; and sending a second notification of context graph change to the recommender.

15. The computer-readable storage medium of claim 13, wherein the event data includes high-level event data generated by the mobile device from contextual data.

16. The computer-readable storage medium of claim 13, wherein the computer-readable storage medium stores additional instructions that, when executed, cause the computer to perform additional steps comprising:

receiving a query for context graph data from the recommender; and sending the context graph data to the recommender.

17. The computer-readable storage medium of claim 13, wherein the computer-readable storage medium stores additional instructions that, when executed, cause the computer to perform additional steps comprising:

receiving real-time event data through a RESTful WebAPI; and modifying the context graph based on the received real-time event data.

18. The computer-readable storage medium of claim 13, wherein the computer-readable storage medium stores additional instructions that, when executed, cause the computer to perform additional steps comprising:

receiving bulk upload of event data through an event posting interface; and modifying the context graph based on the received bulk upload event data.

19. The method of claim 1, further comprising:

sending a second notification to the recommender by pushing events into the recommender's publish/subscribe system asynchronously using a long-poll persistent push connection.

20. The method of claim 1, wherein sending the notification comprises notifying the recommender of topological changes in the context graph and/or changes to individual properties of nodes and edges in the context graph.

* * * * *